(12) United States Patent
Numata et al.

(10) Patent No.: US 10,819,080 B1
(45) Date of Patent: Oct. 27, 2020

(54) COATING-LESS NONPLANAR PLANAR RING OSCILLATOR LASER

(71) Applicant: United States of America as represented by the Administrator of NASA, Washington, DC (US)

(72) Inventors: Kenji Numata, Greenbelt, MD (US); Anthony Yu, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/540,796

(22) Filed: Aug. 14, 2019

(51) Int. Cl.
| | |
|---|---|
| *H01S 3/06* | (2006.01) |
| *H01S 3/16* | (2006.01) |
| *H01S 3/101* | (2006.01) |
| *H01S 3/0941* | (2006.01) |

(52) U.S. Cl.
CPC .......... *H01S 3/0627* (2013.01); *H01S 3/0615* (2013.01); *H01S 3/09415* (2013.01); *H01S 3/101* (2013.01); *H01S 3/1611* (2013.01); *H01S 3/1643* (2013.01)

(58) Field of Classification Search
CPC ...... H01L 2924/40407; H01L 31/0547; G03H 1/0408
USPC .................................. 372/41, 92, 93, 94, 69
See application file for complete search history.

(56) References Cited

U.S. PATENT DOCUMENTS

| | | | | |
|---|---|---|---|---|
| 3,538,453 A | * | 11/1970 | Miller ..................... | H01S 3/025 372/108 |
| 4,578,793 A | * | 3/1986 | Kane ..................... | H01S 3/0606 372/50.1 |
| 4,723,841 A | | 2/1988 | Roy et al. | |
| 4,749,842 A | | 6/1988 | Kane et al. | |
| 5,148,444 A | * | 9/1992 | Berger .................... | H01S 3/083 372/12 |
| 8,275,015 B2 | * | 9/2012 | Li ........................ | H01S 3/0606 372/69 |

* cited by examiner

*Primary Examiner* — Tuan N Nguyen
(74) *Attorney, Agent, or Firm* — Christopher O. Edwards; Bryan A. Geurts; Helen M. Galus

(57) ABSTRACT

Coating-less nonplanar ring oscillator lasers are disclosed. Such lasers may eliminate the need for thin-film optical coatings from a laser cavity, solving the problem of optical damage to the coatings, and thus, providing a longer useful lifetime for the laser for space or terrestrial applications. Such lasers may be compact, ultra-stable, and highly reliable, enabling a low phase noise, single frequency laser in a compact package. Such lasers may be used in CW and/or in pulse mode.

20 Claims, 13 Drawing Sheets

100

500

COATING-LESS NONPLANAR PLANAR RING OSCILLATOR LASER

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to lasers, and more specifically, to coating-less nonplanar ring oscillator (NPRO) lasers.

BACKGROUND

In NASA missions such as the Laser Interferometer Space Antenna (LISA) mission, the Aeronomy, Chemistry, and Dynamics of the Mesosphere (ACaDAMe) mission, the Ice, Cloud, and land Elevation Satellite (ICESAT-2) mission, and the methane sounder instrument mission, 1-µm lasers are used as their laser sources. These lasers are most commonly 1064-nm single-mode Nd:YAG lasers and operate in a continuous-wave (CW) mode or in a pulse mode. Reliability and output power of such lasers are often limited by optically induced damage on dielectric thin film optical coatings, which typically have a lower damage threshold than the optic substrate bulk materials that the coatings are deposited on.

The NASA missions described above require single-frequency, single-mode, highly-stable Nd:YAG lasers. Higher optical power is usually desirable as a CW seed laser for interferometric applications, for example, and as a pulsed (Q-switched) oscillator for lidar applications, for example. Laser induced damage on optical coatings is the most common catastrophic failure mechanism in high power lasers. Such coating damage has been experienced in lasers during the developmental phases of previous missions, such as Global Ecosystem Dynamics Investigation Lidar (GEDI), ICESAT-1, and ICESAT-2 for Earth science, as well as for future missions, such as sodium lidar for heliophysics. The coating within the laser cavity is usually the most susceptible due to the high intra-cavity fluence.

Conventional laser technologies include conventional nonplanar ring oscillator (NPRO) lasers (called monolithic isolated single-mode end-pumped rings (MISER) at the time), such as that discussed in U.S. Pat. No. 4,749,842, have stable single-frequency operation due to their monolithic design that integrates all key laser components into a pre-polished crystal. The crystal of an NPRO laser, which is typically made from Nd:YAG, forms an optical cavity within the crystal using total internal reflection (TIR) on all reflection surfaces except for one. The surface that does not satisfy the TIR condition (i.e., the front face) is coated to be highly reflective/transmissive at the signal and pump wavelengths, respectively, and serves as an output coupler mirror in the laser resonator.

FIGS. 1A and 1B illustrate a conventional NPRO crystal 100. In crystal 100, the output coupler surface is coated. The angle of incidence (AOI) at the output coupler surface is less than the TIR critical angle (e.g., ~33° for Nd:YAG). The AOI at all other surfaces is greater than the critical angle. The out-of-plane angle is approximately 0° to 90°, with ~45° being typical.

The ring resonator of an NPRO laser is designed to be nonplanar (i.e., the optical path is not on a flat plane). This nonplanar reflection causes a slight rotation of the polarization direction. When combined with an external magnetic field, this causes large differential loss between the two oscillation directions, and results in unidirectional lasing, which eliminates the spatial hole burning effect typically seen in a standing wave laser. CW NPRO is used, for example, in the Gravity Recovery and Climate Experiment Follow-On (GRACEFO) mission and in the LISA mission. For pulsed Q-switch operation, a Q-switch material (a saturable absorber, e.g., $Cr^{4+}$:YAG) is often diffusion bonded to the laser material (e.g., Nd:YAG), precisely polished to form the NPRO cavity, and then coated. This type of Q-switch NPRO is used in the methane lidar as a pump source for a non-linear frequency conversion crystal, for example.

In conventional Q-switch lasers, multiple discrete optical components are used, such as a highly reflective mirror, an output coupler, a polarizer, and a Q-switch material. This results in a relatively long cavity, a larger mechanical structure, and many optically coated surfaces within the laser cavity. This type of conventional Q-switch laser was used, for example, in the Mars Orbiter Laser Altimeter (MOLA) instrument in the Mars Global Surveyor (MGS), as well as in the Geoscience Laser Altimeter System (GLAS) instrument in ICESAT.

A coating-less laser design was patented in U.S. Pat. No. 3,538,453. This design utilized a frustrated TIR (FTIR) ring oscillator (FTIR-RO) and was based on a monolithic crystal, TIR reflections, and FTIR. The light travels along a planar square path within the laser crystal. The inventors were unaware of any experimental realization of this concept. A similar coating-less planar optical cavity (non-laser) based on FTIR was tested for other applications. Such coating-less optical cavities have now been conceived for advanced LIGO (Laser Interferometer Gravitational-wave Observatory).

The lasers discussed above suffer from various disadvantages. Conventional NPRO requires special dichroic coatings on the output surface of the laser crystal. Damage to these coatings can limit the output power of the NPRO, especially in the pulse (Q-switch) mode. Conventional Q-switch lasers based on multiple optical components have many optical coatings within the laser cavity. They include a highly reflective coating on the end mirror, a partly reflective coating at the output coupler, and anti-reflective coatings on all other surfaces within the laser cavity. For the end pumping scheme, one of the coatings must be a special dichroic coating, having highly reflective/transmissive at the signal/pump wavelengths, respectively. Damage to those coatings is a major concern in designing high energy lasers.

The conventional long cavity supports multiple longitudinal modes. Multiple temporal peaks are often seen in the conventional Q-switch lasers within a pulse due to the mode beatings between the longitudinal modes. Great care needs to be taken to have as small a number of modes as believed to be possible to avoid optical damage caused by the transition between the multi-mode and single-mode operations. As a result, this type of laser is more vulnerable to catastrophic coating damage. The FTIR-RO has no inherent polarization rotation along the optical path within the crystal because the optical path forms a planar surface. Thus, this type of laser does not provide high stability for the output direction and for single longitudinal mode oscillation.

Accordingly, improved lasers that reduce the risks of laser damage on optical coatings in order to build more reliable lasers for both space and terrestrial applications may be beneficial.

SUMMARY

Certain embodiments of the present invention may provide solutions to the problems and needs in the art that have not yet been fully identified, appreciated, or solved by conventional laser technologies. For example, some embodiments pertain to coating-less nonplanar ring oscillator lasers.

In an embodiment, an apparatus includes a laser crystal including a plurality of surfaces. The plurality of surfaces define an optical cavity within the laser crystal that solely uses TIR. The apparatus also includes an optical coupling glass located proximate to an output coupler surface of the laser crystal. The optical coupling glass is located sufficiently close to the output coupler surface to implement FTIR. No optical coating is included on the output coupler surface. Laser light traveling along an internal optical path within the laser crystal forms a non-planar ring.

In another embodiment, a laser crystal includes a plurality of surfaces configured to provide TIR and an output coupler surface located sufficiently close to an optical coupling glass to implement FTIR. No optical coating is included on the output coupler surface. Laser light traveling along an internal optical path within the laser crystal forms a non-planar ring.

In yet another embodiment, a laser includes a laser crystal including a plurality of surfaces. The plurality of surfaces define an optical cavity within the laser crystal that solely uses TIR. The laser also includes an optical coupling glass located proximate to an output coupler surface of the laser crystal. The optical coupling glass is located sufficiently close to the output coupler surface to implement FTIR. The laser further includes a light source configured to produce a pump light and a magnet configured to supply a magnetic field to the laser crystal along an internal optical path of the laser crystal. No optical coating is included on the output coupler surface. A net direction of the magnetic field along the internal optical path determines an output beam direction. The internal optical path forms a non-planar ring.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1A:
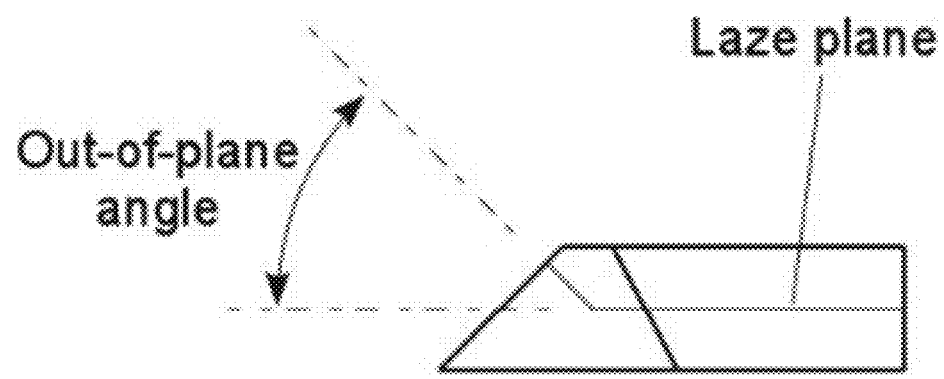
FIG. 1A is a side view illustrating a conventional NPRO laser crystal.
Figure 1B:
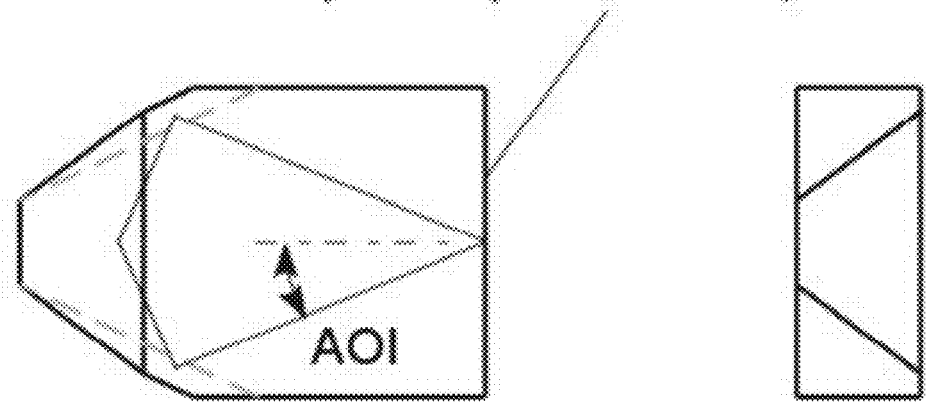
FIG. 1B is a top view illustrating the conventional NPRO laser crystal of FIG. 1A.

Some embodiments of the present invention pertain to coating-less nonplanar ring oscillator lasers. Reducing or minimizing the number of optical components in a laser, and thus reducing or minimizing the use of thin film optical coatings inside the laser cavity, is beneficial for constructing the reliable lasers of some embodiments. Indeed, some embodiments eliminate thin-film optical coatings from a laser cavity to solve the problem of optical damage to the coatings and thus provide a longer useful lifetime for the laser for space or terrestrial applications. Such lasers may be compact, ultra-stable, and highly reliable, being based on proven NPRO laser technology, which enables a low phase noise, single frequency laser in a compact package. Some embodiments may be used in CW and/or impulse mode, and may be used for altimeters, interferometers, or any other suitable device without deviating from the scope of the invention.

Some embodiments include a monolithic laser crystal, the surfaces of which are precisely polished to form an optical cavity within the crystal that solely uses TIR. However, in certain embodiments, the crystal may not be monolithic and may include two or more pieces. As the laser crystal, a material that has a well-defined strong absorption and emission wavelengths (e.g., an Nd:YAG crystal with 808-nm pumping (absorption) and 1064-nm emission) may be used. Unlike conventional NPRO, some embodiments realize TIR for all crystal surfaces and use FTIR for the output coupler surface, eliminating the need for optical coatings. Therefore, this type of laser is called FTIR-NPRO herein. The shape of the FTIR-NPRO crystal in some embodiments can be similar to existing crystals that may be used for NPRO. However, in this case, it should be verified that the output coupler and other reflection surfaces satisfy the TIR condition, having a large enough AOI for the internal ray. The ring resonator of an FTIR-NPRO in some embodiments is also designed to be nonplanar, i.e., the optical path is not on a flat plane.

The concept of TIR is used in some embodiments to confine light within a higher refractive medium ($n_H$) that is surrounded by a lower refractive medium ($n_L$). In some embodiments, this lower refractive medium nL may be air or a vacuum. TIR occurs when light propagating inside this higher index material ($n_H$) is reflected back within the medium when the incident angle at the boundary is greater than the critical angle, defined as $\arcsin(n_L/n_H)$. FTIR happens when a third medium is placed very close to the boundary where TIR occurs (e.g., on the order of a fraction of the laser wavelength). In some embodiments, this fraction may be approximately half of the laser wavelength or less. This distance also determines the amount of light that couples out of the cavity. This third medium "frustrates" the TIR event and can be used to couple the evanescent waves at the boundary into this third medium.

The amount of light coupled out of the TIR is dependent on the distance between the two higher refractive index media with the lower refractive index medium between them. This lower refractive index medium has a lower refractive index than the two higher refractive index media. For instance, if the whole assembly is submerged in water, which has a refractive index of n=1.33, the setup still works since water is used in this case as the lower refractive index medium. Such a setup may be used if thermal management requires for the entire assembly to be submerged in a cooling fluid, for example.

Thus, the FTIR phenomena can be used as the output coupler in a laser cavity, and the reflectivity of this output coupler depends on the distance between the two high index materials. In this case, the third medium, e.g., flat or convex optical glass, is placed at the output coupler port, which may be at any of the TIR surfaces without deviating from the scope of the invention. The distance between the two surfaces is on the order of a fraction of the laser wavelength in some embodiments.

The distance can be optimized by looking at the output power (or energy). The distance changes the effective reflectivity of the surface. It changes how many times the signal light circulates within the laser cavity, and thus, changes the laser output power. Typically, the reflectivity of the output coupler cannot be changed unless the output coupler is stripped and a different coating is applied. Practically speaking, there is always an optimum reflectivity per a given laser cavity. The optimum reflectivity may be determined by the loss and gain per round trip. In this case, the reflectivity can be optimized looking at the output power while changing the distance. This is another advantage of some embodiments of the present invention.

The third medium can be a saturable absorber to make the laser operation mode into Q-switching (pulsed) mode. This concept to use a CW laser crystal in pulse mode may be somewhat similar to U.S. Pat. No. 4,723,841. However, this patent described a TIR surface, and not an FTIR surface.

Figure 2:
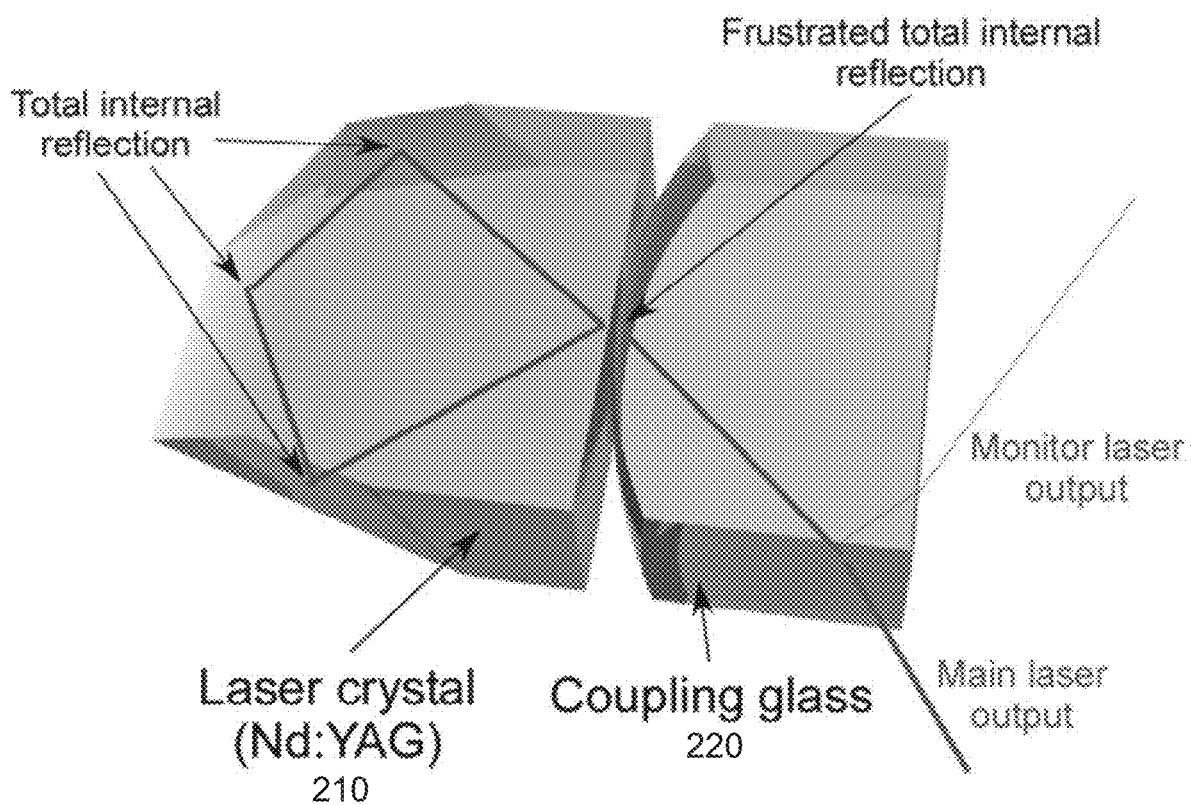
FIG. 2 is a perspective view illustrating a coating-less FTIR-NPRO laser, according to an embodiment of the present invention.

An embodiment of a coating-less FTIR-NPRO laser 200 is shown in FIG. 2. Laser 200 includes an Nd:YAG laser crystal 210 and an optical coupling glass 220. All surfaces of laser crystal 210 cause TIR, save for the output coupler surface, which is located very near to optical coupling glass 220 (i.e., within a fraction of a wavelength of the laser). This output coupler surface allows laser light to escape laser crystal 210, and to leave optical coupling glass 220 as a (stronger) main output laser and a (weaker) monitor output laser. However, it should be noted that in some embodiments, and as discussed further below, laser crystal 210 and/or optical coupling glass 220 may have different shapes without deviating from the scope of the invention.

If based on the standard four reflection NPRO crystal design, there are at least two different approaches to design the FTIR-NPRO crystal of some embodiments. One approach is to use a near-45° AOI on all four surfaces and to use a relatively small nonplanar, or out-of-plane, angle (e.g., a few degrees). As a result, the crystal is nearly a square prism, and the optical beam path within the crystal is nearly a square. The block is also nearly a square.

Using this approach, it is relatively easy to satisfy the FTIR condition since the near-45° AOI is already larger than the critical angle of nearly every laser material that has a refractive index larger than 1.41. For example, Nd:YAG has a typical refractive index of ~1.82. This design modifies the FTIR-RO crystal design, where a square, but planar, optical path is assumed.

Figure 3A:
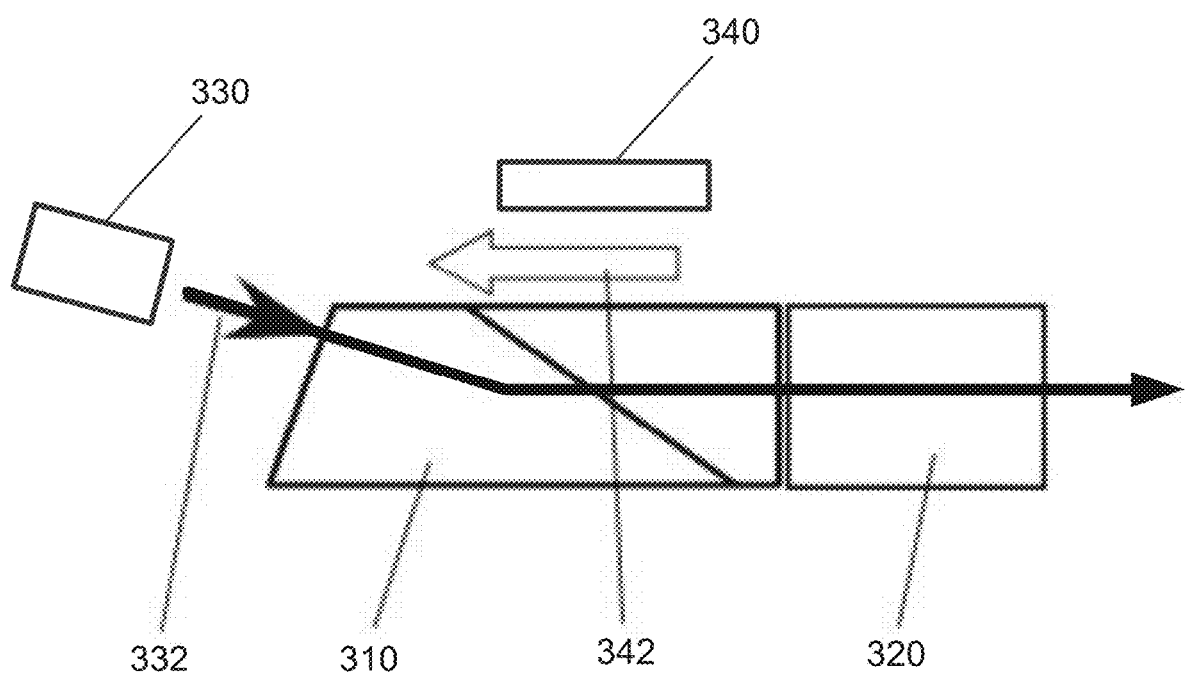
FIG. 3A is a side view illustrating a coating-less FTIR-NPRO laser, according to an embodiment of the present invention.
Figure 3B:
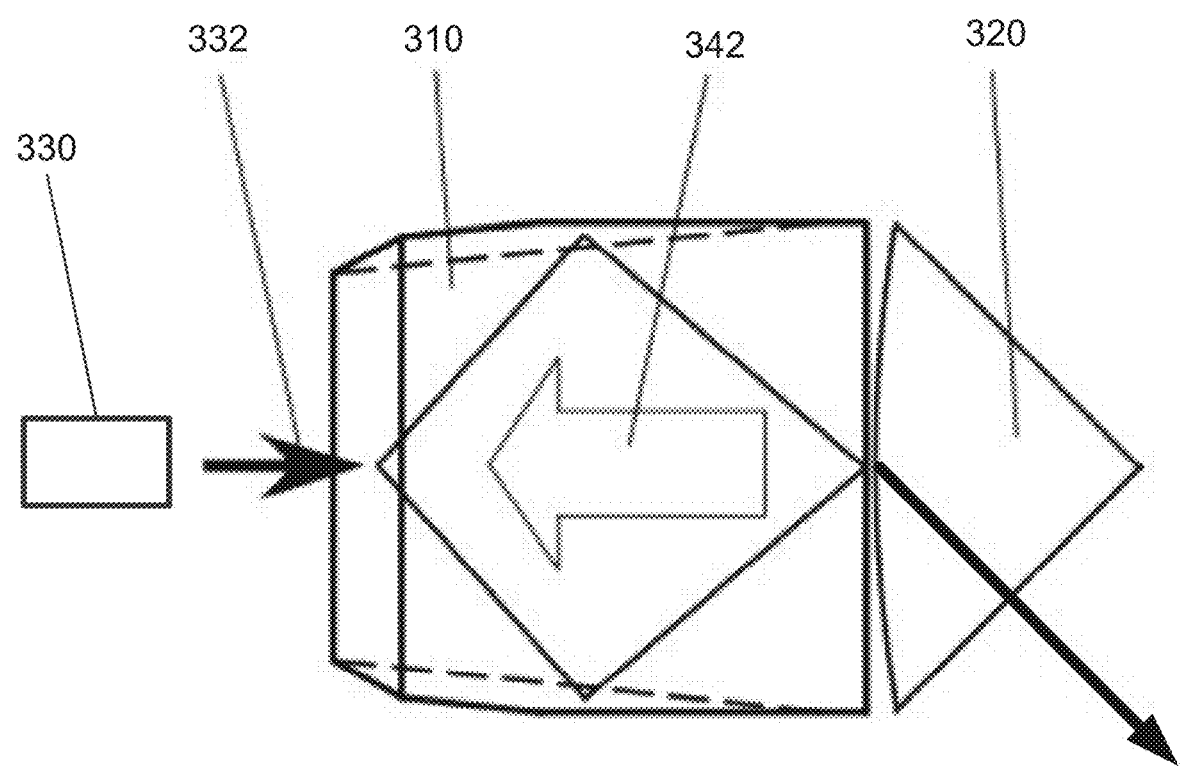
FIG. 3B is a top view illustrating the coating-less FTIR-NPRO laser of FIG. 3A, according to an embodiment of the present invention.

FIGS. 3A and 3B are side and top views, respectively, illustrating a coating-less FTIR-NPRO laser 300, according to an embodiment of the present invention. Laser 300 includes an NPRO crystal 310 having TIR on all surfaces except for the output coupler surface adjacent to an optical coupling glass 320. The distance between NPRO crystal 310 and optical coupling glass 320 is a fraction of a wavelength. NPRO crystal 310 may be made from Nd:YAG, for example, and has no coating applied. Optical coupling glass 320 may be made from fused silica for CW mode operation or from Cr:YAG for pulsed mode operation, for example.

A light source 330 produces a pump light 332. Light source 330 may be an 808 nm fiber-coupled multimode diode or any other suitable source without deviating from the scope of the invention. A magnet 340 (e.g., a neodymium block magnet) supplies a magnetic field 342. It should be noted that the positions of the components in FIGS. 3A and 3B may differ from what is shown in actual implementations, and are provided to teach the concept, as would be readily appreciated by one skilled in the art.

Figure 4A:
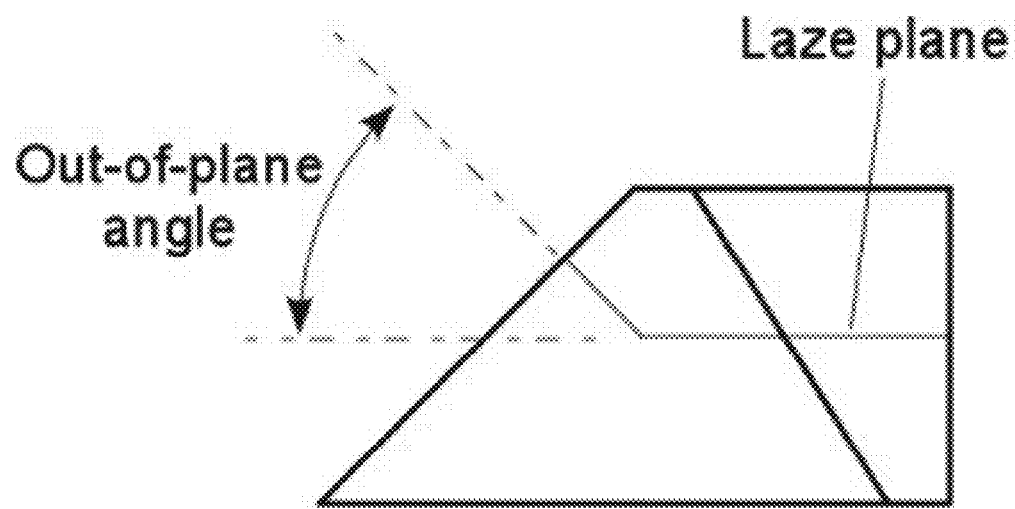
FIG. 4A is a side view illustrating a coating-less FTIR-NPRO laser crystal, according to an embodiment of the present invention.
Figure 4B:
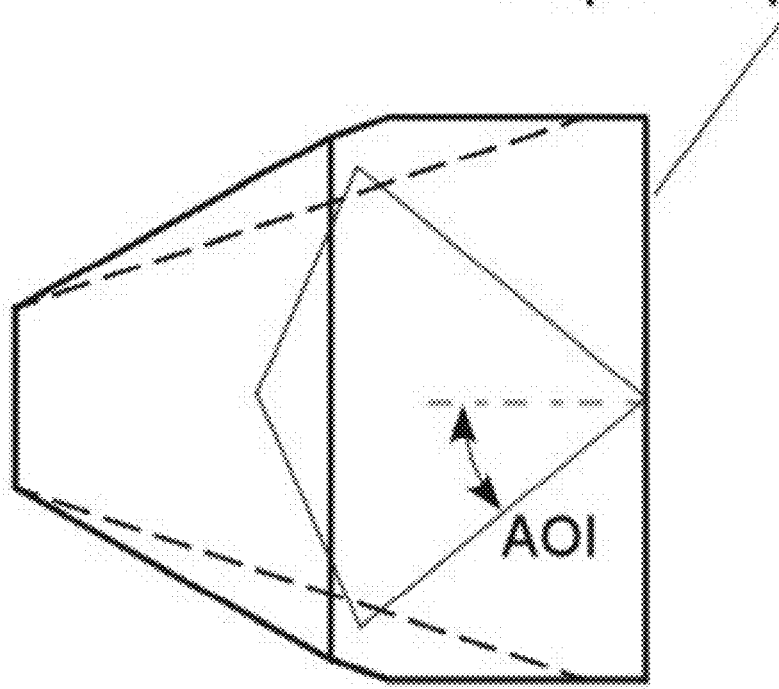
FIG. 4B is a top view illustrating the coating-less FTIR-NPRO laser crystal of FIG. 4A, according to an embodiment of the present invention.

Another approach is to maintain as large an out-of-plane (nonplanar) angle as possible as opposed to a standard NPRO crystal design, and also design a wide and thick crystal in order to make the AOI at the output coupler larger than what is done conventionally. Such an approach is depicted in FTIR-NPRO laser crystal 400 of FIGS. 4A and 4B. Laser crystal 400 has a smaller AOI at the FTIR surface than NPRO crystal 310 of FIGS. 3A and 3B and a relatively large out-of-plane angle with respect to NPRO crystal 310 as well. For instance, laser crystal 400 has an AOI of 36° whereas NPRO crystal 310 has an AOI of 40°. Importantly, both are smaller than the 33.4° critical angle. The out-of-plane angle for laser crystal 400 is 45° as opposed to 20° for NPRO crystal 310.

The pump light (e.g., 808 nm for Nd:YAG) can be coupled into the crystal from one of the TIR surfaces. At first glance, it may seem impossible to use the end pumping scheme commonly used for conventional NPRO designs due to the all-TIR design. There are at least three approaches to pump the FTIR-NPRO in some embodiments.

Figure 5A:
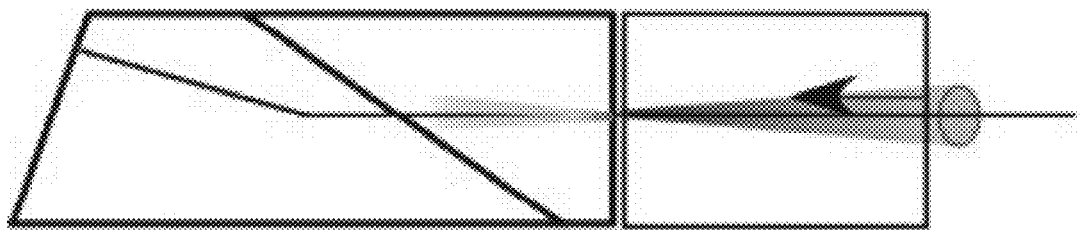
FIG. 5A is a side view illustrating end pumping through an FTIR surface of a coating-less FTIR-NPRO laser crystal, according to an embodiment of the present invention.
Figure 5B:
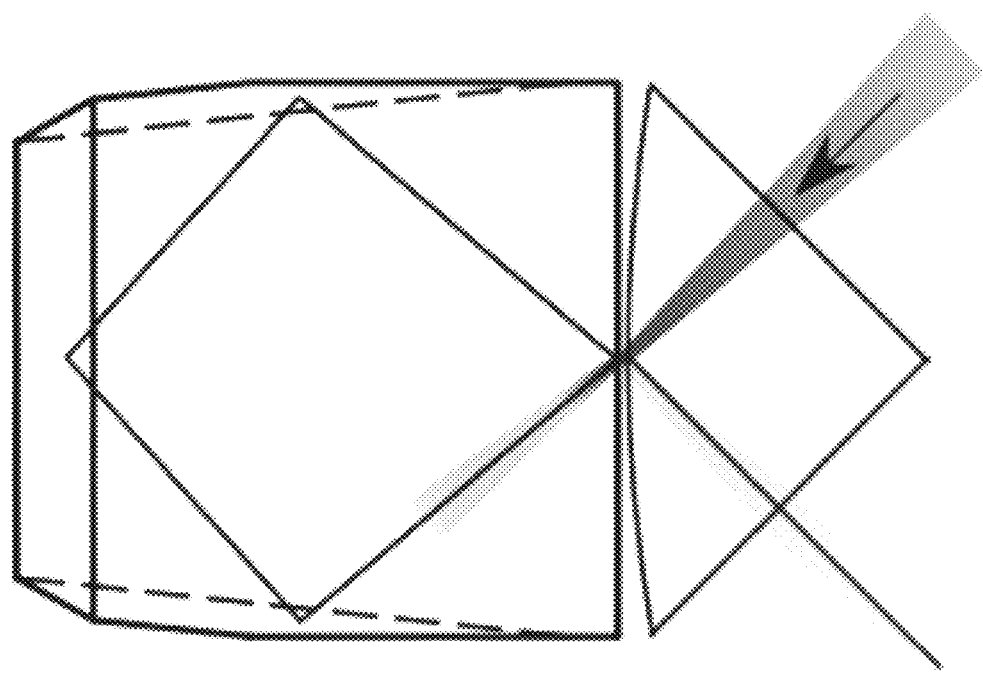
FIG. 5B is a top view illustrating end pumping through the FTIR surface of the coating-less FTIR-NPRO laser crystal, according to an embodiment of the present invention.

End pumping through the FTIR surface may be used in some embodiments. Such a scheme 500 is shown in FIGS. 5A and 5B. Since the pump light has a shorter wavelength than the output laser wavelength, the FTIR surface has a stronger coupling (i.e., a higher transmission) for the pump light. Therefore, when the FTIR surface has ~90% effective reflectivity needed for laser operation at the signal wavelength of some embodiments, the FTIR surface has ~70% effective reflectivity (~30% transmission) at the pump wavelength. Thus, the loss is due to FTIR. At the expense of 70% power loss, the crystal can be end pumped along the optical path through the FTIR surface, but with lower efficiency compared to conventional end pumping. For this, a single-mode pump diode or a low-order multi-mode pump diode ($M^2<10$) may be particularly suitable. $M^2$ is a measure of beam quality, and can be greater than 300 for multi-mode pump diodes.

Figure 6A:
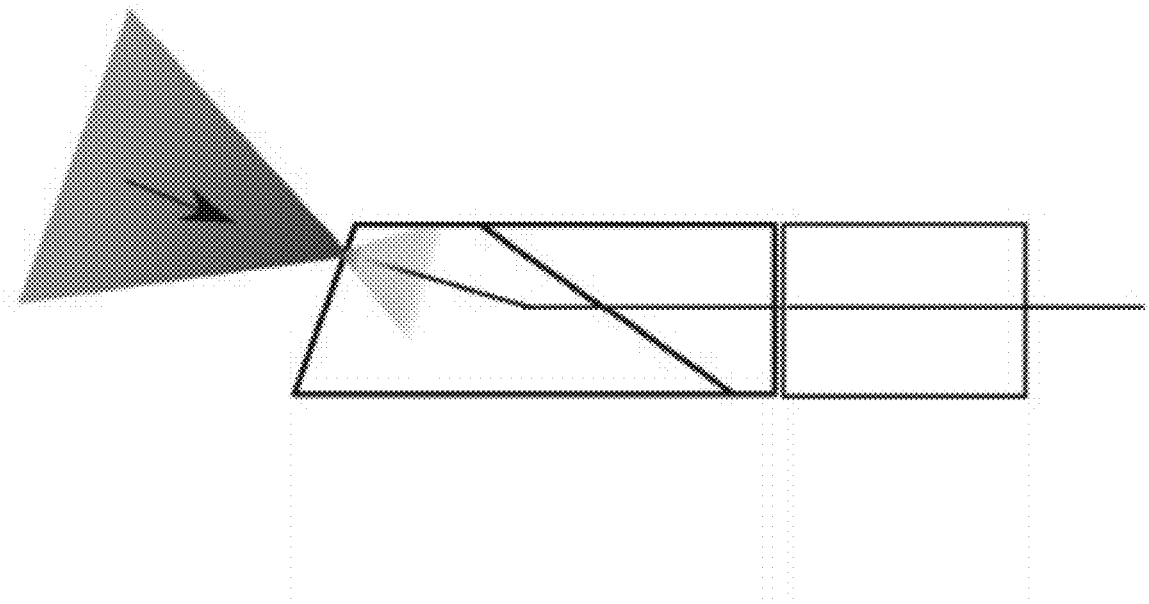
FIG. 6A is a side view illustrating spot end pumping at a TIR surface of the coating-less FTIR-NPRO laser crystal, according to an embodiment of the present invention.
Figure 6B:
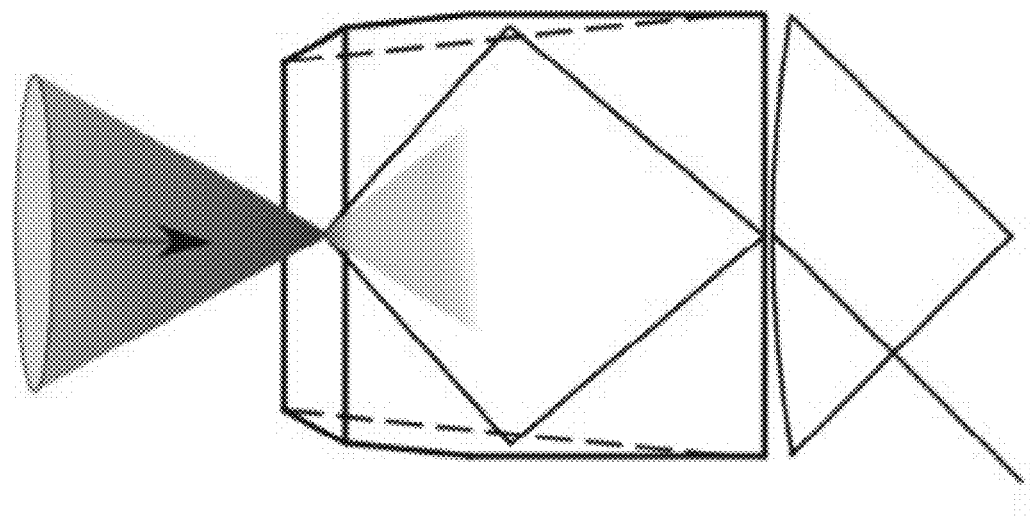
FIG. 6B is a top view illustrating spot end pumping at the TIR surface of the coating-less FTIR-NPRO laser crystal, according to an embodiment of the present invention.

Some embodiments use spot end pumping at a TIR surface. Such a scheme 600 is shown in FIGS. 6A and 6B. The FTIR-NPRO of some embodiments, and also standard NPRO, can be pumped at the reflection point on the TIR surface(s). The pump light is perpendicular to the TIR surface. The loss is due to Fresnel reflection and mode mismatch. The pump beam size should be on the order of the absorption length in order to maximize overlap between the absorption region and the signal beam path. In this scheme, a low-order multi-mode pump diode (M2<10) and a higher pump absorbing material (e.g., 2% Nd Ceramic YAG instead of standard 1% Nd:YAG) may be particularly suitable.

Figure 7A:
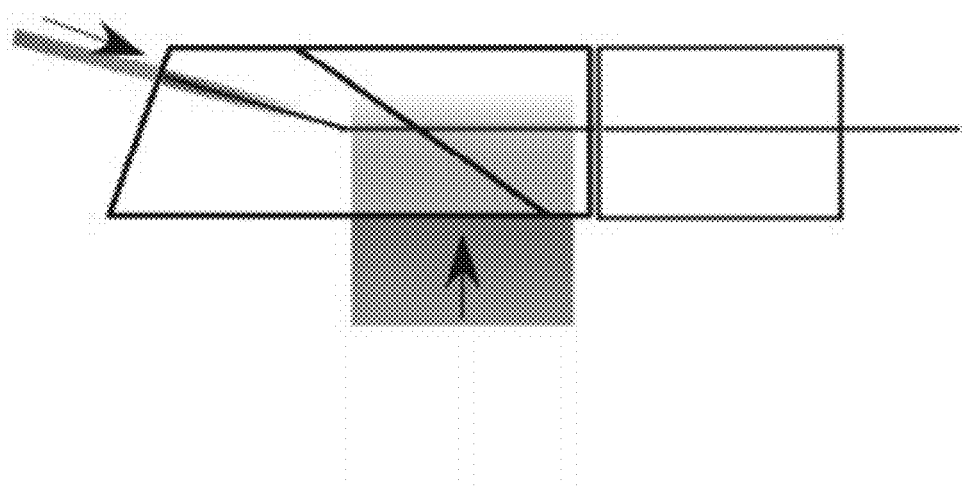
FIG. 7A is a side view illustrating side pumping for the coating-less FTIR-NPRO laser crystal, according to an embodiment of the present invention.
Figure 7B:
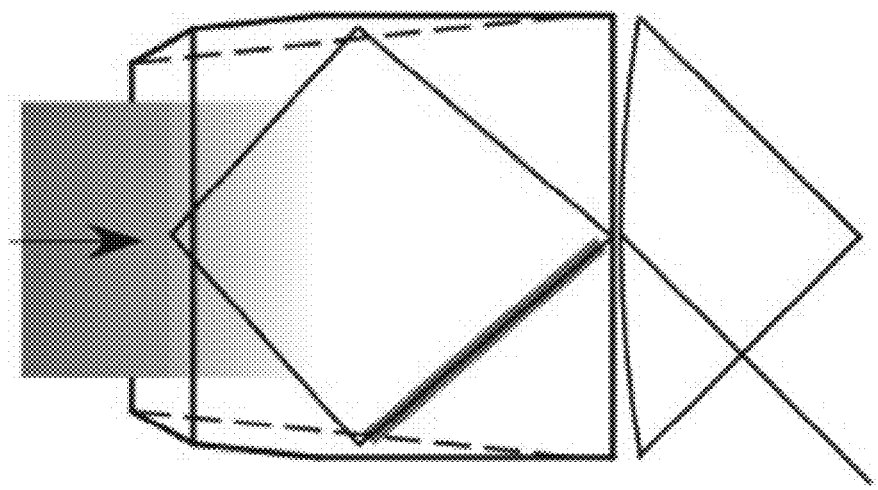
FIG. 7B is a top view illustrating side pumping for the coating-less FTIR-NPRO laser crystal, according to an embodiment of the present invention.

Some embodiments use side pumping. Such a scheme 700 is shown in FIGS. 7A and 7B. The FTIR-NPRO of some embodiments can be side pumped from any of the flat surfaces of the crystal. The loss is due to absorption between the surface and the laze plane.

For this technique, use of a pump laser diode bar that has a stripe beam pattern may be particularly beneficial. The stripe beam pattern should be aligned to the internal beam path. This technique can be used on the TIR surface. Also, it can be combined with a multi-path side-pumping scheme (see, e.g., U.S. Pat. No. 8,275,015).

If use of the bottom surface of the crystal (no TIR surface) is desired, the distance to the laze plane can be minimized by polishing. Then, a magnetic field can be applied to the crystal along the optical path, similar to standard NPRO. The net direction of the magnetic field along the internal optical path determines the output beam direction through the Faraday effect.

As in conventional NPRO, the FTIR-NPRO crystal and the optical coupling glass of some embodiments should be placed on a temperature-controlled thermal interface when high output frequency stability is desired or required. The temperature controlled thermal interface usually sits on a temperature-controlled plate (not shown), which could be below NPRO crystal 310 and optical coupling glass 320 in FIG. 3A, for example. The output frequency of the FTIR-NPRO can be adjusted by attaching a piezo-electric transducer and by mechanically deforming the crystal.

The FTIR-NPRO of some embodiments achieves high stability, high output power, and high reliability both in CW mode and pulsed mode. Such embodiments do not require thin film optical coatings, damage to which is a major problem in developing high power, reliable lasers. Thus, such embodiments can provide more reliable laser operation and higher output power. Also, since a traveling wave cavity may be provided with an internal polarization rotation mechanism (through the nonplanar optical path), the output mode may be ensured to be single longitudinal mode and stable. Furthermore, the possibility of damage due to the transition between multimode and single-mode oscillation is eliminated.

Coupling of the FTIR can be adjusted to make an air-gap cube beamsplitter in some embodiments, where the distance between the two surfaces determines the FTIR coupling strength. The FTIR-NRPO crystal of some embodiments can be used both for Q-switching and CW mode. The crystal does not need to be a bonded material for Q-switching operation in some embodiments. This differs from conventional NPRO, where it is not possible to change the output coupling strength and/or operation modes because the thin film coatings completely determine the crystal properties and there is no flexibility.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a laser crystal comprising a plurality of surfaces, the plurality of surfaces defining an optical cavity within the laser crystal that solely uses total internal reflection (TIR); and an optical coupling glass located proximate to an output coupler surface of the laser crystal, the optical coupling glass located sufficiently close to the output coupler surface to implement frustrated TIR (FTIR), wherein no optical coating is included on the output coupler surface, and laser light traveling along an internal optical path within the laser crystal forms a non-planar ring.

2. The apparatus of claim 1, wherein the laser crystal is an Nd:YAG having an 808 nm absorption wavelength and a 1064 nm emission wavelength.

3. The apparatus of claim 1, wherein the optical coupling glass is located a fraction of the laser wavelength from the output coupler surface of the laser crystal.

4. The apparatus of claim 1, wherein the apparatus is configured to operate in both continuous wave (CW) mode and pulsed mode.

5. The apparatus of claim 1, wherein four surfaces of the plurality of surfaces of the laser crystal have an approximately 45-degree angle of incidence (AOI), and the laser crystal has an out-of-plane angle of 45 degrees or less.

6. The apparatus of claim 1, wherein the optical coupling glass comprises fused silica or Cr:YAG.

7. The apparatus of claim 1, further comprising:

a magnet configured to supply a magnetic field to the laser crystal along an internal optical path of the laser crystal, wherein a net direction of the magnetic field along the internal optical path determines an output beam direction.

8. The apparatus of claim 1, wherein the laser crystal has an angle-of-incidence (AOI) of approximately 40 degrees and an out-of-plane angle of approximately 20 degrees.

9. The apparatus of claim 1, further comprising:

an external laser diode light source configured to produce a pump light.

10. The apparatus of claim 9, wherein the external laser diode light source is configured to direct the pump light into a surface of the optical coupling glass to provide end pumping.

11. The apparatus of claim 9, wherein the external laser diode light source is configured direct the pump light into the output coupler surface of the laser crystal to provide spot end pumping.

12. The apparatus of claim 1, further comprising:

a diode bar light source configured to produce a pump light that hits the laser crystal at a TIR location along the internal optical path.

13. The apparatus of claim 1, further comprising:

a diode bar light source configured to produce a pump light that hits a bottom surface or a top surface of the laser crystal at a TIR location along the internal optical path.

14. A laser crystal, comprising:

a plurality of surfaces configured to provide total internal reflection (TIR); and an output coupler surface located sufficiently close to an optical coupling glass to implement FTIR, wherein no optical coating is included on the output coupler surface, and laser light traveling along an internal optical path within the laser crystal forms a non-planar ring.

15. The laser crystal of claim 14, wherein four surfaces of the plurality of surfaces that are configured to provide TIR have an approximately 45-degree angle of incidence (AOI), and the laser crystal has an out-of-plane angle of 45 degrees or less.

16. The laser crystal of claim 14, wherein the laser crystal has an angle-of-incidence (AOI) of approximately 40 degrees and an out-of-plane angle of approximately 20 degrees.

17. A laser, comprising:

a laser crystal comprising a plurality of surfaces, the plurality of surfaces defining an optical cavity within the laser crystal that solely uses total internal reflection (TIR);

an optical coupling glass located proximate to an output coupler surface of the laser crystal, the optical coupling glass located sufficiently close to the output coupler surface to implement frustrated TIR (FTIR);

a pump light source configured to produce a pump light; and a magnet configured to supply a magnetic field to the laser crystal along an internal optical path of the laser crystal, wherein no optical coating is included on the output coupler surface, a net direction of the magnetic field along the internal optical path determines an output beam direction, and the internal optical path forms a non-planar ring.

18. The laser of claim 17, wherein four surfaces of the plurality of surfaces of the laser crystal have an approximately 45-degree angle of incidence (AOI), and the laser crystal has an out-of-plane angle of 45 degrees or less.

19. The laser of claim 17, wherein the laser crystal has an angle-of-incidence (AOI) of approximately 40 degrees and an out-of-plane angle of approximately 20 degrees.

20. The laser of claim 17, wherein the pump light source comprises a diode bar light source configured to produce the pump light that hits the laser crystal at a TIR location along the internal optical path, or that hits a bottom surface or a top surface of the laser crystal at a TIR location along the internal optical path.

* * * * *